United States Patent
Eberlein et al.

(10) Patent No.: US 11,249,812 B2
(45) Date of Patent: Feb. 15, 2022

(54) TEMPORARY COMPENSATION OF OUTAGES

(71) Applicant: SAP SE, Walldorf (DE)

(72) Inventors: Peter Eberlein, Heidelberg (DE); Volker Driesen, Malsch (DE)

(73) Assignee: SAP SE, Walldorf (DE)

( * ) Notice: Subject to any disclaimer, the term of this patent is extended or adjusted under 35 U.S.C. 154(b) by 154 days.

(21) Appl. No.: 16/521,642

(22) Filed: Jul. 25, 2019

(65) Prior Publication Data

US 2021/0026694 A1    Jan. 28, 2021

(51) Int. Cl.
*G06F 9/46* (2006.01)
*G06F 9/50* (2006.01)
*G06Q 30/06* (2012.01)

(52) U.S. Cl.
CPC ............ *G06F 9/505* (2013.01); *G06F 9/5083* (2013.01); *G06Q 30/0633* (2013.01)

(58) Field of Classification Search
CPC .............................. G06F 9/505; G06F 9/5083
See application file for complete search history.

(56) References Cited

U.S. PATENT DOCUMENTS

| | | | |
|---|---|---|---|
| 5,946,708 A * | 8/1999 | Fang | G06F 12/0866 711/113 |
| 7,523,142 B2 | 4/2009 | Driesen et al. | |
| 7,657,575 B2 | 2/2010 | Eberlein et al. | |
| 7,720,992 B2 | 5/2010 | Brendle et al. | |
| 2,199,904 A1 | 6/2010 | Eberlein et al. | |
| 7,739,387 B2 | 6/2010 | Eberlein et al. | |
| 7,971,209 B2 | 6/2011 | Eberlein et al. | |
| 8,126,919 B2 | 2/2012 | Eberlein | |
| 8,200,634 B2 | 6/2012 | Driesen et al. | |
| 8,225,303 B2 | 7/2012 | Wagner et al. | |
| 8,250,135 B2 | 8/2012 | Driesen et al. | |
| 8,291,038 B2 | 10/2012 | Driesen | |
| 8,301,610 B2 | 10/2012 | Driesen et al. | |
| 8,356,010 B2 | 1/2013 | Driesen | |
| 8,375,130 B2 | 2/2013 | Eberlein et al. | |
| 8,380,667 B2 | 2/2013 | Driesen | |
| 8,392,573 B2 | 3/2013 | Lehr et al. | |
| 8,402,086 B2 | 3/2013 | Driesen et al. | |
| 8,407,297 B2 | 3/2013 | Schmidt-Karaca et al. | |
| 8,434,060 B2 | 4/2013 | Driesen et al. | |
| 8,467,817 B2 | 6/2013 | Said et al. | |
| 8,479,187 B2 | 7/2013 | Driesen et al. | |
| 8,560,876 B2 | 10/2013 | Driesen et al. | |

(Continued)

OTHER PUBLICATIONS

U.S. Appl. No. 15/847,627, filed Dec. 19, 2017, Boer et al.

(Continued)

*Primary Examiner* — Camquy Truong
(74) *Attorney, Agent, or Firm* — Fish & Richardson P.C.

(57) ABSTRACT

Methods, systems, and computer-readable storage media for determining, by an application instance, that first data is to be requested, transmitting, by a total outage compensator of the application instance, one or more requests for the first data to one or more peer application instances, receiving, by the total outage compensator, a response to a request for the first data, the response including the data, and executing, by the instance of the application instance, at least one function based on the first data.

20 Claims, 4 Drawing Sheets

(56) References Cited

U.S. PATENT DOCUMENTS

| | | |
|---|---|---|
| 8,572,369 B2 | 10/2013 | Schmidt-Karaca et al. |
| 8,589,568 B2 * | 11/2013 | Arnold .............. H04L 29/12301 709/228 |
| 8,604,973 B2 | 12/2013 | Schmidt-Karaca et al. |
| 8,612,406 B1 | 12/2013 | Said et al. |
| 8,631,406 B2 | 1/2014 | Driesen et al. |
| 8,645,483 B2 | 2/2014 | Odenheimer et al. |
| 8,706,772 B2 | 4/2014 | Hartig et al. |
| 8,732,083 B2 | 5/2014 | Vasing et al. |
| 8,751,573 B2 | 6/2014 | Said et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,031,910 B2 | 5/2015 | Driesen |
| 9,032,406 B2 | 5/2015 | Eberlein |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,336,227 B2 | 5/2016 | Eberlein et al. |
| 9,348,929 B2 | 5/2016 | Eberlein |
| 9,354,860 B2 | 5/2016 | Eberlein et al. |
| 9,354,871 B2 | 5/2016 | Eberlein et al. |
| 9,361,093 B2 | 6/2016 | Meissner et al. |
| 9,361,326 B2 | 6/2016 | Driesen et al. |
| 9,367,199 B2 | 6/2016 | Klemenz et al. |
| 9,372,685 B1 | 6/2016 | Luettge et al. |
| 9,436,724 B2 | 9/2016 | Driesen et al. |
| 9,471,659 B2 | 10/2016 | Driesen et al. |
| 9,501,516 B2 | 11/2016 | Driesen |
| 9,519,675 B2 | 12/2016 | Specht et al. |
| 9,569,283 B2 | 2/2017 | Eberlein |
| 9,632,802 B2 | 4/2017 | Said et al. |
| 9,633,107 B2 | 4/2017 | Said et al. |
| 9,639,448 B2 | 5/2017 | Gebhard et al. |
| 9,652,214 B1 | 5/2017 | Eberlein |
| 9,652,744 B2 | 5/2017 | Eberlein et al. |
| 9,672,140 B1 | 6/2017 | Eberlein |
| 9,678,740 B2 | 6/2017 | Heine et al. |
| 9,703,554 B2 | 7/2017 | Eberlein et al. |
| 9,720,994 B2 | 8/2017 | Driesen et al. |
| 9,721,116 B2 | 8/2017 | Driesen et al. |
| 9,740,476 B2 | 8/2017 | Eberlein et al. |
| 9,767,424 B2 | 9/2017 | Biewald et al. |
| 9,800,689 B2 | 10/2017 | Said et al. |
| 9,836,299 B2 | 12/2017 | Eberlein et al. |
| 9,854,045 B2 | 12/2017 | Said et al. |
| 9,858,309 B2 | 1/2018 | Eberlein et al. |
| 9,875,273 B2 | 1/2018 | Eberlein et al. |
| 9,898,279 B2 | 2/2018 | Eberlein et al. |
| 9,898,494 B2 | 2/2018 | Eberlein et al. |
| 9,898,495 B2 | 2/2018 | Eberlein et al. |
| 9,927,992 B2 | 3/2018 | Driesen et al. |
| 10,013,337 B2 | 7/2018 | Eberlein et al. |
| 10,025,568 B2 | 7/2018 | Mayer et al. |
| 10,055,215 B2 | 8/2018 | Specht et al. |
| 10,061,788 B2 | 8/2018 | Said et al. |
| 10,083,061 B2 | 9/2018 | Odenheimer et al. |
| 10,120,886 B2 | 11/2018 | Eberlein et al. |
| 10,157,052 B2 | 12/2018 | Eberlein et al. |
| 10,157,068 B2 | 12/2018 | Arians et al. |
| 10,185,552 B2 | 1/2019 | Eberlein et al. |
| 10,187,393 B2 | 1/2019 | Odenheimer et al. |
| 10,191,733 B2 | 1/2019 | Driesen |
| 10,230,708 B2 | 3/2019 | Eberlein |
| 10,268,472 B2 | 4/2019 | Eberlein et al. |
| 10,268,692 B2 | 4/2019 | Mayer et al. |
| 10,270,743 B2 | 4/2019 | Eberlein |
| 10,291,704 B2 | 5/2019 | Eberlein et al. |
| 10,296,324 B2 | 5/2019 | Burkhardt et al. |
| 10,298,591 B2 | 5/2019 | Eberlein et al. |
| 10,303,665 B2 | 5/2019 | Engelko et al. |
| 10,311,077 B2 | 6/2019 | Specht et al. |
| 2004/0172459 A1 * | 9/2004 | Schwalm ............ H04L 67/2852 709/217 |
| 2006/0171405 A1 | 8/2006 | Brendle et al. |
| 2007/0185720 A1 | 8/2007 | Eberlein et al. |
| 2007/0239800 A1 | 10/2007 | Eberlein |
| 2008/0222248 A1 | 9/2008 | Eberlein et al. |
| 2009/0106371 A1 | 4/2009 | Schmidt-Karaca et al. |
| 2009/0106372 A1 | 4/2009 | Schmidt-Karaca et al. |
| 2009/0150479 A1 | 6/2009 | Eberlein et al. |
| 2009/0172110 A1 | 7/2009 | Eberlein et al. |
| 2010/0161648 A1 | 6/2010 | Eberlein et al. |
| 2011/0154445 A1 | 6/2011 | Schmidt-Karaca et al. |
| 2012/0136839 A1 | 5/2012 | Eberlein et al. |
| 2012/0159435 A1 | 6/2012 | Driesen et al. |
| 2012/0023125 A1 | 10/2012 | Driesen et al. |
| 2013/0085810 A1 | 4/2013 | Driesen et al. |
| 2013/0144945 A1 | 6/2013 | Said et al. |
| 2013/0166415 A1 | 6/2013 | Odenheimer et al. |
| 2013/0166416 A1 | 6/2013 | Eberlein |
| 2013/0324201 A1 | 12/2013 | Eberlein et al. |
| 2013/0325672 A1 | 12/2013 | Odenheimer et al. |
| 2013/0339488 A1 | 12/2013 | Eberlein et al. |
| 2014/0019429 A1 | 1/2014 | Driesen et al. |
| 2014/0025441 A1 | 1/2014 | Eberlein et al. |
| 2014/0047319 A1 | 2/2014 | Eberlein |
| 2014/0117076 A1 | 5/2014 | Eberlein |
| 2014/0149158 A1 | 5/2014 | Odenheimer et al. |
| 2014/0156724 A1 | 6/2014 | Said et al. |
| 2014/0164963 A1 | 6/2014 | Klemenz et al. |
| 2014/0325069 A1 | 10/2014 | Odenheimer et al. |
| 2015/0006608 A1 | 1/2015 | Eberlein et al. |
| 2015/0088890 A1 * | 3/2015 | Hoffert ............ G06F 16/24553 707/737 |
| 2015/0188890 A1 | 7/2015 | Said et al. |
| 2015/0220576 A1 | 8/2015 | Eberlein |
| 2015/0220591 A1 | 8/2015 | Eberlein et al. |
| 2015/0222665 A1 | 8/2015 | Eberlein et al. |
| 2016/0026698 A1 | 1/2016 | Eberlein et al. |
| 2016/0063050 A1 | 3/2016 | Schoen et al. |
| 2016/0098253 A1 | 4/2016 | Hutzel et al. |
| 2016/0127325 A1 | 5/2016 | Odenheimer et al. |
| 2017/0103226 A1 | 4/2017 | Eberlein et al. |
| 2017/0116296 A1 | 4/2017 | Specht et al. |
| 2017/0161291 A1 | 6/2017 | Specht et al. |
| 2017/0161511 A1 | 6/2017 | Eberlein et al. |
| 2017/0286467 A1 | 10/2017 | Eberlein et al. |
| 2017/0329505 A1 | 11/2017 | Richter et al. |
| 2017/0344362 A1 | 11/2017 | Burkhardt et al. |
| 2017/0351442 A1 | 12/2017 | Specht et al. |
| 2018/0041568 A1 | 2/2018 | Eberlein |
| 2018/0081668 A1 | 3/2018 | Eberlein |
| 2018/0095953 A1 | 4/2018 | Mayer et al. |
| 2018/0129676 A1 | 5/2018 | Eberlein et al. |
| 2018/0137010 A1 | 5/2018 | Mayer et al. |
| 2018/0137145 A1 | 5/2018 | Mayer et al. |
| 2018/0137146 A1 | 5/2018 | Mayer et al. |
| 2018/0144117 A1 | 5/2018 | Engler et al. |
| 2018/0146056 A1 | 5/2018 | Eberlein |
| 2018/0268154 A1 | 9/2018 | Specht et al. |
| 2018/0285097 A1 | 10/2018 | Radermacher et al. |
| 2018/0285390 A1 | 10/2018 | Mayer et al. |
| 2018/0300332 A1 | 10/2018 | Odenheimer et al. |
| 2018/0316685 A1 | 11/2018 | Eberlein et al. |
| 2018/0316772 A1 | 11/2018 | Eberlein et al. |
| 2018/0329930 A1 | 11/2018 | Eberlein et al. |

(56) References Cited

U.S. PATENT DOCUMENTS

| | | |
|---|---|---|
| 2018/0331927 A1 | 11/2018 | Eberlein et al. |
| 2018/0336365 A1 | 11/2018 | Eberlein et al. |
| 2019/0007420 A1 | 1/2019 | Eberlein et al. |
| 2019/0018874 A1 | 1/2019 | Eberlein et al. |
| 2019/0034460 A1 | 1/2019 | Eberlein |
| 2019/0129985 A1 | 5/2019 | Schlarb et al. |
| 2019/0129986 A1 | 5/2019 | Birn et al. |
| 2019/0129988 A1 | 5/2019 | Auer et al. |
| 2019/0129990 A1 | 5/2019 | Schlarb et al. |
| 2019/0129991 A1 | 5/2019 | Auer et al. |
| 2019/0129997 A1 | 5/2019 | Auer et al. |
| 2019/0130010 A1 | 5/2019 | Auer et al. |
| 2019/0130121 A1 | 5/2019 | Birn et al. |
| 2019/0166209 A1 | 5/2019 | Mueller et al. |
| 2020/0057863 A1* | 2/2020 | Seewald ............... H04L 9/0894 |

OTHER PUBLICATIONS

U.S. Appl. No. 15/874,317, filed Jan. 18, 2018, Eberlein et al.
U.S. Appl. No. 15/883,680, filed Jan. 30, 2018, Eberlein.
U.S. Appl. No. 15/970,499, filed May 3, 2018, Eberlein et al.
U.S. Appl. No. 15/983,812, filed May 18, 2018, Eberlein et al.
U.S. Appl. No. 16/173,225, filed Oct. 29, 2018, Eberlein et al.
U.S. Appl. No. 16/200,427, filed Nov. 26, 2018, Mueller et al.
U.S. Appl. No. 16/208,920, filed Dec. 4, 2018, Eberlein et al.
U.S. Appl. No. 16/214,724, filed Dec. 10, 2018, Eberlein et al.
U.S. Appl. No. 16/219,358, filed Dec. 13, 2018, Eberlein et al.
U.S. Appl. No. 16/219,371, filed Dec. 13, 2018, Eberlein et al.
U.S. Appl. No. 16/219,375, filed Dec. 13, 2018, Eberlein.
U.S. Appl. No. 16/297,057, filed Mar. 8, 2019, Eberlein.
U.S. Appl. No. 16/402,453, filed May 3, 2019, Eberlein.
U.S. Appl. No. 16/410,076, filed May 13, 2019, Eberlein et al.

* cited by examiner

TEMPORARY COMPENSATION OF OUTAGES

BACKGROUND

Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

An example architecture includes microservices, which have gained popularity in service-oriented architectures (SOAs). In microservice architectures, applications are composed of multiple, independent services, and are deployed in standalone containers with a well-defined interface. The services are deployed and managed by a cloud platform and run on top of a cloud infrastructure. Microservice architectures also include so-called backing services. A backing service is any service an application consumes over the network as part of its normal operation. Backing services may consume other backing services in turn, creating a service mesh of dozens, maybe hundreds of services with dependencies therebetween.

Microservice architectures can include mechanisms (e.g., redundancy, resilience) to minimize outages of services. However, it is not guaranteed to achieve 100% availability. This is especially true if looking at the total availability of all services that an application is composed of. Even if each service achieves an availability of 99.99%, the total availability is much smaller. To compensate for this situation, an additional architecture concept is needed to help improve on availability and deliver improved performance (e.g., with respect to service level agreements (SLAs)).

SUMMARY

Implementations of the present disclosure are directed to mitigating temporary outages of persistence layers in architectures having multiple peer application instances. More particularly, implementations of the present disclosure are directed to using temporary outage compensators in application instances to request data from one or more peer application instances in cases of persistence layer outages.

In some implementations, actions include determining, by an application instance, that first data is to be requested, transmitting, by a total outage compensator of the application instance, one or more requests for the first data to one or more peer application instances, receiving, by the total outage compensator, a response to a request for the first data, the response including the data, and executing, by the instance of the application instance, at least one function based on the first data. Other implementations of this aspect include corresponding systems, apparatus, and computer programs, configured to perform the actions of the methods, encoded on computer storage devices.

These and other implementations can each optionally include one or more of the following features: transmitting the one or more requests for the data to the one or more peer application instances is executed in response to determining that the data is unavailable from a local cache and determining that the data is unavailable from a persistence layer; determining that the data is unavailable from a local cache and determining that the data is unavailable from a persistence layer is executed by the total outage compensator of the application instance; actions further include determining that second data is to be written to the backing service, and writing the second data to a local cache of the application instance; writing the second data to the local cache of the application instance is performed in response to determining that a persistence layer is unavailable; actions further include transmitting the second data to a persistence layer; and the application instance and each of the peer application instances execute functionality for at least one of sales order entry, user identity management, document management, and logging.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
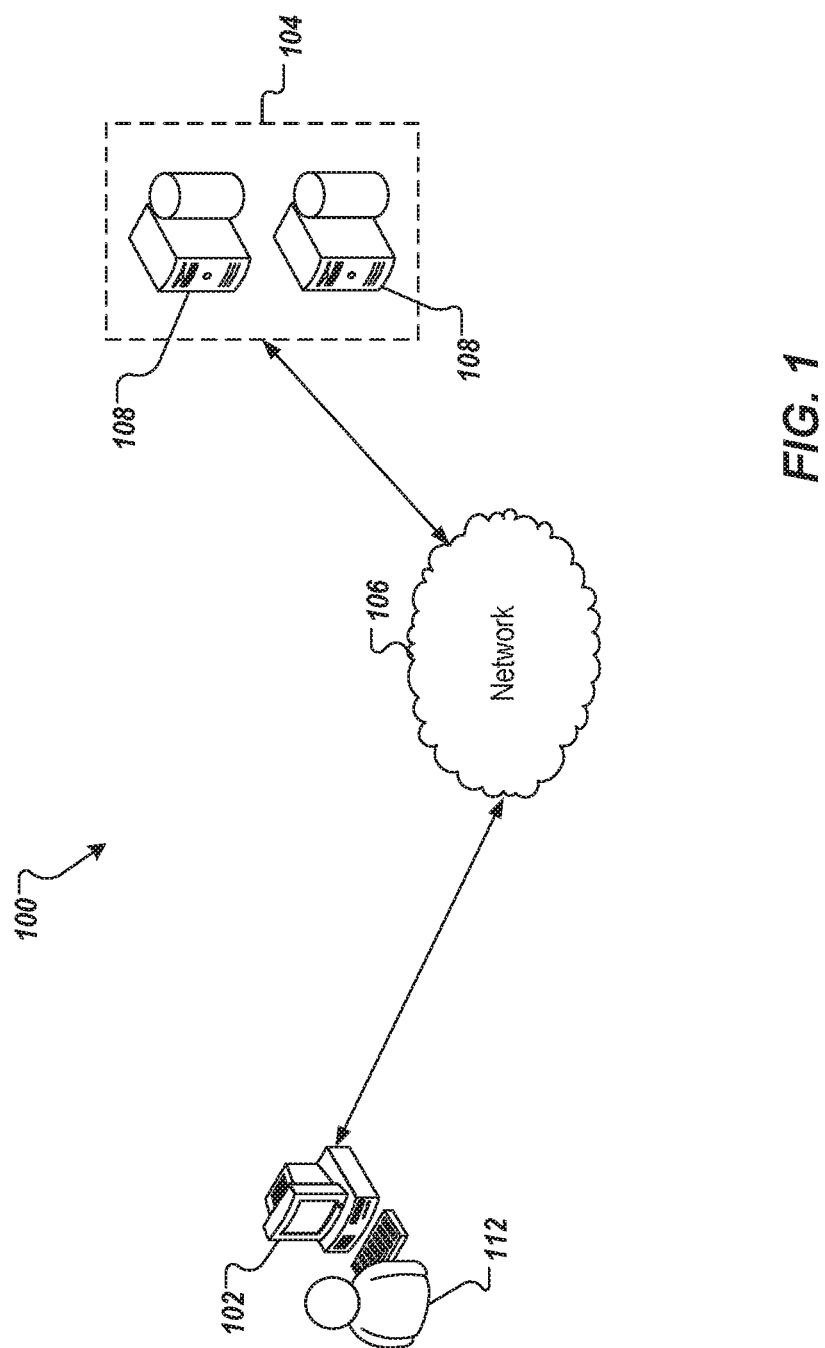
FIG. 1 depicts an example architecture that can be used to execute implementations of the present disclosure.

Implementations of the present disclosure are directed to mitigating temporary outages of persistence layers in architectures having multiple peer application instances. More particularly, implementations of the present disclosure are directed to using temporary outage compensators in application instances to request data from one or more peer application instances in cases of persistence layer outages. Implementations can include actions of determining, by an application instance, that first data is to be requested, transmitting, by a total outage compensator of the application instance, one or more requests for the first data to one or more peer application instances, receiving, by the total outage compensator, a response to a request for the first data, the response including the data, and executing, by the instance of the application instance, at least one function based on the first data.

Implementations of the present disclosure are described in further detail herein with reference to an example context. The example context includes microservice architectures including microservice-based applications where a backing service provides data persistence (e.g., functions as a persistence layer). It is contemplated, however, that implementations of the present disclosure can be realized in any appropriate context. That is, implementations of the present disclosure can be generally realized in architectures having concurrent peer application instances that each locally cache data received from a persistence layer.

To provide further context for implementations of the present disclosure, and as introduced above, in microservice architectures, applications are composed of multiple, independent services, and are deployed in standalone containers with a well-defined interface. In some examples, an application based on microservices can be described as a collection of independent, but loosely coupled services providing modularity, and easing understanding, development, and testing of the application. Each service can be provided as one or more computer-executable programs. A microservices-based application parallelizes development by enabling service-specific teams to independently develop, deploy, and scale their respective services.

The services are deployed and managed by a cloud platform and run on top of a cloud infrastructure. Microservice architectures also include so-called backing services. A backing service is any service an application consumes over the network as part of its normal operation. Backing services may consume other backing services in turn, creating a service mesh of dozens, maybe hundreds of services with dependencies therebetween. Microservice architectures can include mechanisms (e.g., redundancy, resilience) to minimize outages of services. However, it is not guaranteed to achieve 100% availability. This is especially true if looking at the total availability of all services that an application is composed of. Even if each service achieves an availability of 99.99% (which would require significant increase in both software and hardware resources), the total availability is much smaller. To compensate for this situation, an additional architecture concept is needed to help improve on availability and deliver improved performance with respect to service level agreements (SLAs). A level of non-availability increases with increasing number of services used. For example, each service can have downtime, the sum of the individual downtimes adds up to the downtime of the application that uses the services. Thus, the more services involved, the harder it is to deliver required availability targets.

In view of the above context, implementations of the present disclosure provide a temporary outage compensator (TOC) that mitigates temporary outages of backing services in microservice-based architectures. More particularly, implementations of the present disclosure are directed to a TOC that minimizes impacts of outages of backing services on microservice-based applications that depend on the backing services, even if individual backing services experience temporary downtime.

In further detail, if a backing service is temporarily unavailable, there is a relatively high likelihood that relevant data of the backing service may still reside in a local cache of an application. In the microservice-based architecture, the application can be provided in one or more runtime instances, each runtime instance also being referred to as an application instance. In some examples, the data is available in the local cache of the application instance where the data is required. In some examples, the data is available in a local cache of another application instance. For example, scale-out and redundancy can result in multiple application instances being used. As described in further detail herein, implementations of the present disclosure leverage the sum of all caches by broadcasting a request for data that cannot be accessed directly from a backing service to all application instances.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 104 can provide a cloud infrastructure to host one more microservice-based applications (e.g., provided as one or more computer-executable programs executed by one or more computing devices). More particularly, multiple instances of a microservices-based application can be executed within the cloud infrastructure, each application instance using one or more backing services.

As described in further detail herein, each application instance includes a TOC that enables mitigation of temporary outages of backing services in microservice-based architectures. More particularly, to increase availability of data provided from backing services, the standard approach of caching the data is extended. In accordance with implementations of the present disclosure, not only data that is read is cached, also data that is written is locally stored for some time. For some services, this might already be implemented to ensure that the data set can be written without loss (e.g., for an audit log service: the log is stored locally, if the audit log service (backing service) is down, and write to log service, if the service is back again). Also using the locally written data to read in case of an outage of the audit log service is an enhancement of this approach. Furthermore, this can be implemented for services that previously did not provide such store-and-forward functionality. This improves data read availability and increases the ability to write data during outages of backing services.

Figure 2:
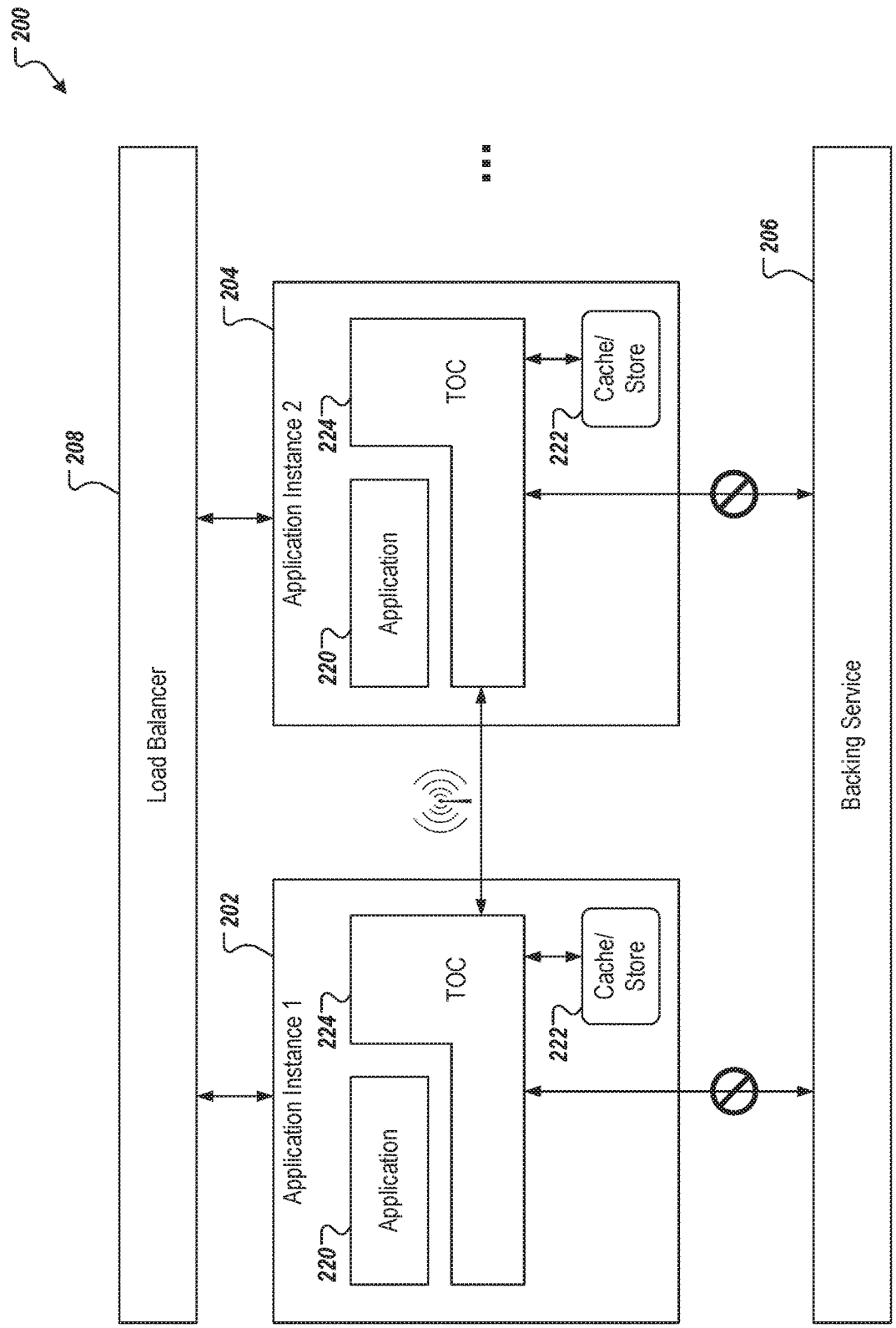
FIG. 2 depicts an example conceptual architecture in accordance with implementations of the present disclosure.

FIG. 2 depicts an example conceptual architecture 200 in accordance with implementations of the present disclosure. The example architecture 200 includes application instances 202, 204 and a backing service 206. Although two application instances 202, 204 are depicted, it is contemplated that implementations of the present disclosure can be realized using any appropriate number of application instances (e.g., tens, hundreds, thousands). Each of the application instances 202, 204 leverages the backing service 206. For example, the backing service executes some functionality to provide data to the application instances 202, 204. Although a single backing service 206 is depicted, it is contemplated that any appropriate number of backing services can be used (e.g., tens, hundreds, thousands).

In accordance with implementations of the present disclosure, the backing service 206 can function as a persistence layer, in which data that is to be processed by the application instances 202, 204 is stored. For example, to execute functionality, each of the application instances 202, 204 can read data from, and/or write data to the backing service 206.

In some implementations, the application instances 202, 204 are each runtime instances of the same microservice-based application. For example, the microservice-based application can be a sales order processing application, and each of the application instances 202, 204 provides functionality for sales order processing. Accordingly, the application instances 202, 204 can be referred to as peer application instances with respect to each other. By having multiple application instances 202, 204 increased availability (e.g., as opposed to a single instance) and redundancy of the microservice-based application are provided.

The example architecture 200 further includes a load balancer 208. In some examples, the load balancer 208 balances demand for functionality provided by the microservice application by distributing the load across the multiple application instances 202, 204. In some examples, as demand increases, additional application instances can be instantiated to account for the increased demand. In some examples, as demand decreases, application instances can be reduced to account for the decreased demand.

In the example of FIG. 2, each application instance 202, 204 includes an application 220, a local cache 222, and a TOC 224. In some examples, the application 220 is provided as computer-executable code that is executed to provide functionality. Example functionality can include, without limitation, sales and order entry, document management (e.g., document creation and editing), user identity management (e.g., user credentials and login), and logging (e.g., audit logging). In some examples, at least a portion of the functionality processes data provided from the backing service 206. For example, data can be received from the backing service 206 for processing within the application instances 202, 204.

In some examples, the data is stored in the local cache 222. For example, the data is temporarily stored in the local cache 222. In this manner, performance can be enhanced. For example, a product catalog can be received from the backing service 206 for processing by the application 220. The product catalog can be stored in the local cache 222. The next time the application 220 needs access to the product catalog, the product catalog can be accessed from the local cache 222 avoiding the need to re-request and receive the product catalog from the backing service 206. Accordingly, peer application instances, such as the application instances 202, 204, can store data in their respective local cache 222, which might be needed by another peer application instance. The local cache 222 can represent a read cache and/or a write cache.

In accordance with implementations of the present disclosure, the TOC 224 is provided as a layer between the application 220 and the local cache 222. In some examples, the TOC 224 is provided as a library within the application code. In some implementations, the TOC 224 provides functionality for reading data from and writing data to the backing service 206.

With regard to reading data, the application 220, through the TOC 224 attempts to read data from the local cache 222. If the data is available in the local cache 222, it is provided to the application 220 through the 224. In some examples, the application 220 reads data from the backing service 206 through the TOC 224. If the backing service 206 is available, the data is read from the backing service 206. If, however, the backing service 206 is unavailable (as depicted in FIG. 2), a data request is broadcast to one or more peer application instances. That is, for example, the TOC 224 of the application instance 202 requests the data from one or more other application instances, such as the application instance 204.

In some implementations, the TOC 224 receives the data request and determines whether the data that is being requested is stored in the local cache 222. If the data is available in the local cache 222, the TOC 224 provides the data to the application instance that requested the data (e.g., the application instance 204 provides the data to the application instance 202). If the data request is broadcast to multiple peer application instances (e.g., two or more), there is a higher likelihood that at least one peer application instance will have the requested data stored locally.

With regard to writing data, the application 220 can write data to the local cache 222 and/or the backing service 206 through the TOC 224. If the backing service 206 is unavailable (as depicted in FIG. 2), the data is written to the local cache 222. Writing of the data to the backing service 206 can be periodically attempted to write the data to the backing service 206 when it is again available. In some examples, in response to writing the data to the local cache 222, the application 220 can broadcast a cache invalidation notification to the multiple peer application instances. In response to receiving the cache invalidation request, each of the multiple peer application instances can remove the respective entries from their caches as those entries are no longer valid (e.g., are not the latest). Subsequently, each of the multiple peer instances can either read from the backing service (if writing to the backing service has been executed and the backing service is available) or from the application instance having the latest data (e.g., if the backing service is unavailable). In this manner, implementations of the present disclosure do not disrupt a cache invalidation process that is typically provided.

In some examples, the broadcast by the TOC 224 is to one or more peer application instances (e.g., application instances of the same microservices-based application). The broadcast includes a request that identifies the data requested (e.g., identifies a product, for which product data is requested), enabling each peer application instance to check its local cache 222 for the data that is requested. If a peer application instance has the data stored in the local cache 222, it provides the data back to the application instance that requested the data. In this manner, peers are polled for the data, avoiding use of a central point of failure for retrieving the data, such as a central registry.

In some implementations, the local cache 222 may cache more data than needed by the respective application instance and/or cache data for longer. That is, data can be more aggressively cached in the local cache 222 to provide availability of data if another peer application instance requests the data (e.g., in response to the backing service 206 being unavailable).

Implementations of the present disclosure are described in further detail herein with reference to example scenarios. The example scenarios include, without limitation, sales order entry, document creation and change, user login, and audit logging.

In some examples, a microservice-based application provides functionality for sales order entry, which can include requiring access to a product catalog (e.g., provided as one or more computer-readable files stored in memory), which provides product data on respective products. That is, for example, the microservice-based application can require access to the product catalog to input data for respective products. In some examples, the product catalog is provided by a backing service. If the product catalog is unavailable, for example, the backing service that maintains the product catalog is down, products cannot be added to a sales order. However, product data for at least some products may be stored in the local cache of one or more application instances. For example, product data for "hot products" that are sold relatively frequently are likely stored in the local cache of one or more application instances.

In accordance with implementations of the present disclosure, if an application instance requires product data for a particular product, the application instance can request the product data from a respective backing service (e.g., if the product data is not already available in the local cache of the application instance). It can occur, however, that the backing service is unavailable. In accordance with implementations of the present disclosure, if the backing service is unavailable, the TOC of the application instance broadcasts a request for the product data to other application instances (e.g., that provide functionality for sales order entry). If another application instance has the product data stored in its local cache, the product data is provided in response to the application. In this manner, call centers, online-shops, and the like can continue to operate (e.g., especially during hours with frequent calls) even in circumstances where backing services are unavailable.

In some examples, a microservice-based application provides functionality for document creation and editing. The document can include a computer-readable/-writable electronic document (e.g., order entry, order document, text document). In some examples, when a document is created it can be stored in a backing service, as well as a local cache (e.g., write cache) of the application instance. In accordance with implementations of the present disclosure, further edits of the document can be performed, even if the backing services is temporarily unavailable. For example, the edits are written to the local cache and, when the backing service is available again, the document stored in the backing service can be updated based on the document stored in the local cache.

In some examples, a microservice-based application provides functionality for user identity management (e.g., for user login). In some examples, the application instance stores users and credentials in the local cache. If a backing service that supports the user identity management is unavailable, the application instance uses the user credentials stored in the local cache to validate a user upon next login. As repeated logons rarely hit the same service instance as before, the differentiating ability to not only use locally cached user information, but broadcasting to all application instances can significantly increase overall re-login success rates. As a consequence, frequent users can still login, as they most likely had logged in shortly before.

In some examples, a microservice-based application provides functionality for logging (e.g., audit logs, developer logs, error logs). For example, the application instance can write logs to the local cache, and subsequently write the logs to a central log service provided as a backing service. If the backing service is unavailable, writing the log data can be retried. If an application instance requires the logging data, while the backing service is unavailable, the TOC of the application instance broadcasts a request, and the logging data can be received from another application instance. This enables full access to logs, even if backing service is unavailable. The application instance itself keeps the log locally for a threshold time (e.g., 1 hour) before.

Figure 3:
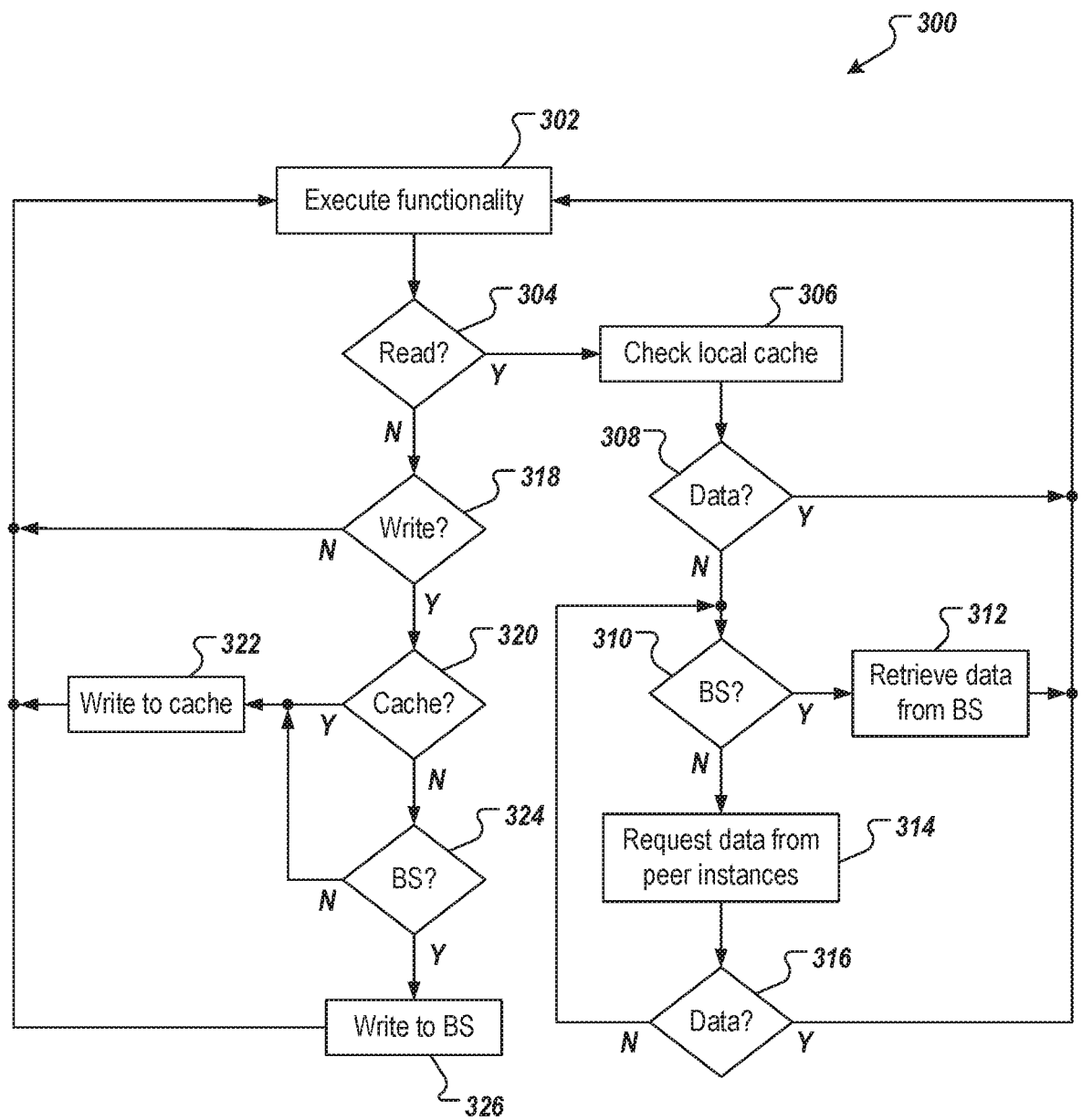
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

Functionality is executed (302). For example, an application instance executes functionality (e.g., sales order entry, document editing, identity management, logging). It is determined whether data is to be read (304). For example, the application instance may need data (e.g., produce data) to perform further functionality (e.g., create a sales order for the product). If data is to be read, the local cache is checked (306). For example, a TOC of the application instance can check a local cache to determine whether the data needed (e.g., the product data) is stored in the local cache. It is determined whether the data is available from the local cache (308). For example, the TOC can determine whether the data is stored in the local cache (e.g., based on a response from the local cache). If the data is available, the data is received from the local cache and the example process 300 loops back.

If the data is not available from the local cache, it is determined whether the backing service is available 310. For example, the TOC can determine whether the backing service is available. In some examples, the TOC can send a request for data to the backing service and a response can be provided. In some examples, the response can include an indication that the backing service is available (e.g., a response including the data requested). If the backing service is available, the data is retrieved from the backing service 312 and the example process 300 loops back. In some examples, the response can indicate that the backing service is not available. If the backing service is not available, the data is requested from peer application instances (314). For example, the TOC broadcasts a request for the data from one or more other application instances.

It is determined whether the data is available from a peer application instance (316). In some examples, the TOC can broadcast a request for data to one or more other application instances and one or more responses can be provided. In some examples, a response can include an indication that the data is available from a respective application instance (e.g., a response including the data requested). If the data is not available from a peer application instance, the example process 300 loops back. If the data is available from a peer application instance, the data is received from the peer application instance, and the example process 300 loops back.

If data is not to be read, it is determined whether data is to be written (318). If data is not to be written, the example process 300 loops back. If data is to be written, it is determined whether the data is to be written to the local cache (320). If the data is to be written to the local cache, the data is written to the cache (322) and the example process 300 loops back. If the data is not to be written to the local cache, it is determined whether the backing service is available (324). If the backing service is not available, the data is written to the cache (322) and the example process 300 loops back. If the backing service is available, the data is written to the backing service (326) and the example process 300 loops back. As introduced above, in some examples, in response to writing the data to the local cache, the application can broadcast a cache invalidation notification to the multiple peer application instances. In response to receiving the cache invalidation request, each of the multiple peer application instances can remove the respective entries from their caches as those entries are no longer valid (e.g., are not the latest). Subsequently, each of the multiple peer instances can either read from the backing service (if writing to the backing service has been executed and the backing service is available) or from the application instance having the latest data (e.g., if the backing service is unavailable).

Implementations of the present disclosure provide technical advantages and are distinct over known systems. Implementations of the present disclosure avoid a central registry that instructs on where data is stored, if stored in a distributed manner. For example, traditional peer-to-peer networks can include portions of data distributed across multiple peers. However, to request the data, a central registry provides information on where the data is stored (i.e., which peers have the data), and the data is requested from those peers. If the central registry is unavailable, the data cannot be requested as it is unknown which peers have the data. Implementations of the present disclosure are distinct from content delivery networks (CDNs), in which a data source pushes data to all CDN servers. In contrast, implementations of the present disclosure provide for local caches selectively receiving data from another local cache in the occurrence of outage of the persistence layer. Implementations of the present disclosure are also distinct from and provide advantages over distributed databases, in which sharding is provided using a primary key of data objects, the primary key telling which shard the data is stored in. This is prone to failure, however, because, if shard fails, all data in the shard is unavailable (e.g., the same problem as with backing service outage).

Figure 4:
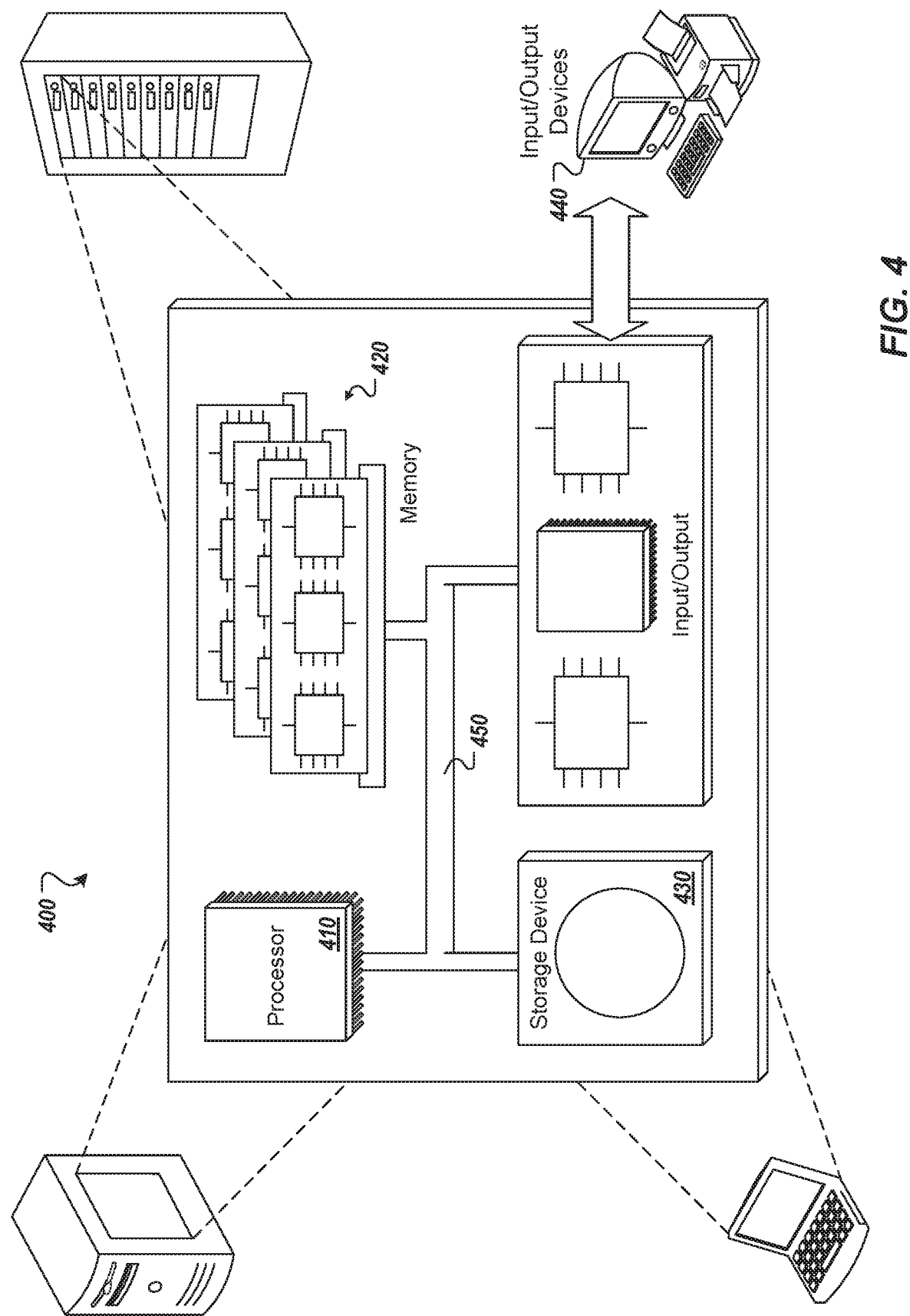
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for execution of peer application instances in microservice-based architectures, the method being executed by one or more processors and comprising:
   providing a plurality of application instances of a microservice-based application executed in a cloud infrastructure, each application instance comprising an application, a local cache, and a total outage compensator that provides the application access to the local cache, each total outage compensator enabling a respective application instance to broadcast data requests to every other application instance in the plurality of application instances;
   determining, by a first application instance of the plurality of application instances, that first data is to be requested;
   transmitting, by a total outage compensator of the first application instance, requests for the first data to each other application instance of the plurality of application instances;
   receiving, by the total outage compensator, a response to a request for the first data from a second application instance of the plurality of application instances, the response comprising the first data;
   executing, by the instance of the application instance, at least one function based on the first data; and
   broadcasting, by the total outage compensator of the first application instance, a cache invalidation request to each of the other application instances in the plurality of application instance in response to writing data to the local cache of the first application instance.

2. The method of claim 1, wherein transmitting the one or more requests for the data to the one or more peer application instances is executed in response to determining that the first data is unavailable from a local cache and determining that the first data is unavailable from a persistence layer.

3. The method of claim 2, wherein the total outage compensator of the application instance determines that the first data is unavailable from a local cache and determines that the first data is unavailable from the persistence layer.

4. The method of claim 1, further comprising:
   determining that second data is to be written to a persistence layer; and
   writing the second data to a local cache of the first application instance.

5. The method of claim 4, wherein writing the second data to the local cache of the first application instance is performed in response to determining that the persistence layer is unavailable.

6. The method of claim 4, further comprising transmitting the second data to the persistence layer.

7. The method of claim 1, wherein the first application instance and each of the peer application instances execute functionality for at least one of sales order entry, user identity management, document management, and logging.

8. A non-transitory computer-readable storage medium coupled to one or more processors and having instructions stored thereon which, when executed by the one or more processors, cause the one or more processors to perform operations for execution of peer application instances in microservice-based architectures, the operations comprising:
   providing a plurality of application instances of a microservice-based application executed in a cloud infrastructure, each application instance comprising an application, a local cache, and a total outage compensator that provides the application access to the local cache, each total outage compensator enabling a respective application instance to broadcast data requests to every other application instance in the plurality of application instances;
   determining, by a first application instance of the plurality of application instances, that first data is to be requested;
   transmitting, by a total outage compensator of the first application instance, requests for the first data to each other application instance of the plurality of application instances;
   receiving, by the total outage compensator, a response to a request for the first data from a second application instance of the plurality of application instances, the response comprising the first data;
   executing, by the instance of the application instance, at least one function based on the first data; and
   broadcasting, by the total outage compensator of the first application instance, a cache invalidation request to each of the other application instances in the plurality of application instance in response to writing data to the local cache of the first application instance.

9. The computer-readable storage medium of claim 8, wherein transmitting the one or more requests for the data to the one or more peer application instances is executed in response to determining that the first data is unavailable from a local cache and determining that the first data is unavailable from a persistence layer.

10. The computer-readable storage medium of claim 9, wherein the total outage compensator of the application instance determines that the first data is unavailable from a local cache and determines that the first data is unavailable from the persistence layer.

11. The computer-readable storage medium of claim 8, wherein operations further comprise:
   determining that second data is to be written to a persistence layer; and
   writing the second data to a local cache of the first application instance.

12. The computer-readable storage medium of claim 11, wherein writing the second data to the local cache of the first application instance is performed in response to determining that the persistence layer is unavailable.

13. The computer-readable storage medium of claim 11, wherein operations further comprise transmitting the second data to the persistence layer.

14. The computer-readable storage medium of claim 9, wherein the first application instance and each of the peer application instances execute functionality for at least one of sales order entry, user identity management, document management, and logging.

15. A system, comprising:
   a computing device; and
   a computer-readable storage device coupled to the computing device and having instructions stored thereon which, when executed by the computing device, cause the computing device to perform operations for execution of peer application instances in microservice-based architectures, the operations comprising:
      providing a plurality of application instances of a microservice-based application executed in a cloud infrastructure, each application instance comprising an application, a local cache, and a total outage compensator that provides the application access to the local cache, each total outage compensator enabling a respective application instance to broadcast data requests to every other application instance in the plurality of application instances;
      determining, by a first application instance of the plurality of application instances a microservice-based application, that first data is to be requested;
      transmitting, by a total outage compensator of the first application instance, one or more requests for the first data to one or more peer each other application instance instances of the plurality of application instances;
      receiving, by the total outage compensator, a response to a request for the first data from a second application instance of the plurality of application instances microservice-based application, the response comprising the first data;
      executing, by the instance of the application instance, at least one function based on the first data; and
      broadcasting, by the total outage compensator of the first application instance, a cache invalidation request to each of the other application instances in the plurality of application instance in response to writing data to the local cache of the first application instance.

16. The system of claim 15, wherein transmitting the one or more requests for the data to the one or more peer application instances is executed in response to determining that the first data is unavailable from a local cache and determining that the first data is unavailable from a persistence layer.

17. The system of claim 16, wherein the total outage compensator of the application instance determines that the first data is unavailable from a local cache and determines that the first data is unavailable from a persistence layer.

18. The system of claim 15, wherein operations further comprise:
   determining that second data is to be written to a persistence layer; and
   writing the second data to a local cache of the first application instance.

19. The system of claim 18, wherein writing the second data to the local cache of the first application instance is performed in response to determining that the persistence layer is unavailable.

20. The system of claim 18, wherein operations further comprise transmitting the second data to the persistence layer.

* * * * *